United States Patent
Park et al.

(10) Patent No.: US 10,593,076 B2
(45) Date of Patent: Mar. 17, 2020

(54) LEVEL OF DETAIL CONTROL FOR GEOSTREAMING

(71) Applicant: Oracle International Corporation, Redwood Shores, CA (US)

(72) Inventors: Hoyong Park, San Jose, CA (US); Iuliia Shmeleva, San Francisco, CA (US); Ilya Sergeyevich Shikalov, Saint-Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/993,226

(22) Filed: May 30, 2018

(65) Prior Publication Data

US 2018/0276859 A1    Sep. 27, 2018

Related U.S. Application Data

(63) Continuation of application No. PCT/RU2016/000040, filed on Feb. 1, 2016.

(51) Int. Cl.
   *G06F 16/29* (2019.01)
   *G06F 16/9537* (2019.01)
   (Continued)

(52) U.S. Cl.
   CPC ............ *G06T 11/203* (2013.01); *G06F 16/29* (2019.01); *G06F 16/9537* (2019.01); *G06T 3/40* (2013.01); *G06T 2210/36* (2013.01)

(58) Field of Classification Search
   CPC .. G06F 11/3668; G06F 16/29; G06F 16/9537; G06F 17/30023; G06F 17/30241;
   (Continued)

(56) References Cited

U.S. PATENT DOCUMENTS

| | | |
|---|---|---|
| 5,051,947 A | 9/1991 | Messenger et al. |
| 5,802,262 A | 9/1998 | Van De Vanter |

(Continued)

FOREIGN PATENT DOCUMENTS

| | | |
|---|---|---|
| CN | 101059688 | 10/2007 |
| JP | 2009171193 | 7/2009 |

(Continued)

OTHER PUBLICATIONS

Zhang, Chengyang, and Yan Huang. "Querying streaming point clusters as regions." Proceedings of the ACM Sigspatial International Workshop on GeoStreaming. ACM, 2010 (Year: 2010).*

(Continued)

*Primary Examiner* — Diane M Wills
(74) *Attorney, Agent, or Firm* — Kilpatrick Townsend & Stockton LLP

(57) ABSTRACT

Systems and methods described herein are directed towards controlling a level of detail for geostreaming data. In some examples, an identifying event data that includes location information. A polygon may be defined that comprises points on a map corresponding to the event data. A first level of detail may be determined and a fidelity of the polygon may be changed based at least in part on the first level of detail. Second event data may be received that identifies a location of an object. It may be identified whether the object is within the location information and a user interface may be prepared that presents whether the object is in an affected area.

20 Claims, 12 Drawing Sheets

(51) Int. Cl.
*H04W 4/02* (2018.01)
*G06T 11/20* (2006.01)
*G06T 3/40* (2006.01)

(58) Field of Classification Search
CPC ............ G06F 17/30991; G06F 17/009; G06Q
10/047; G06Q 10/06; G06T 3/40; G06T
11/203; G06T 2210/36; H04W 4/02;
H04W 4/021; H04W 4/022; H04W 4/023;
H04W 4/025; H04W 48/04; H04W 64/00
See application file for complete search history.

(56) References Cited

U.S. PATENT DOCUMENTS

| | | | |
|---|---|---|---|
| 6,092,065 | A | 7/2000 | Floratos et al. |
| 6,108,666 | A | 8/2000 | Floratos et al. |
| 6,353,821 | B1 | 3/2002 | Gray |
| 6,367,034 | B1 | 4/2002 | Novik et al. |
| 6,389,436 | B1 | 5/2002 | Chakrabarti et al. |
| 6,785,677 | B1 | 8/2004 | Fritchman |
| 6,826,566 | B2 | 11/2004 | Lewak et al. |
| 6,856,981 | B2 | 2/2005 | Wyschogrod et al. |
| 6,904,019 | B2 | 6/2005 | Heinen et al. |
| 6,986,019 | B1 | 1/2006 | Bagashev et al. |
| 7,093,023 | B2 | 8/2006 | Lockwood et al. |
| 7,146,352 | B2 | 12/2006 | Brundage et al. |
| 7,224,185 | B2 | 5/2007 | Campbell et al. |
| 7,225,188 | B1 | 5/2007 | Gai et al. |
| 7,236,972 | B2 | 6/2007 | Lewak et al. |
| 7,305,391 | B2 | 12/2007 | Wyschogrod et al. |
| 7,308,561 | B2 | 12/2007 | Cornet et al. |
| 7,440,461 | B2 | 10/2008 | Sahita et al. |
| 7,451,143 | B2 | 11/2008 | Sharangpani et al. |
| 7,483,976 | B2 | 1/2009 | Ross |
| 7,519,577 | B2 | 4/2009 | Brundage et al. |
| 7,519,962 | B2 | 4/2009 | Aman |
| 7,526,804 | B2 | 4/2009 | Shelest et al. |
| 7,552,365 | B1 | 6/2009 | Marsh et al. |
| 7,567,953 | B2 | 7/2009 | Kadayam et al. |
| 7,620,851 | B1 | 11/2009 | Leavy et al. |
| 7,630,982 | B2 | 12/2009 | Boyce |
| 7,636,703 | B2 | 12/2009 | Taylor |
| 7,676,461 | B2 | 3/2010 | Chkodrov et al. |
| 7,689,622 | B2 | 3/2010 | Liu et al. |
| 7,702,629 | B2 | 4/2010 | Cytron et al. |
| 7,716,210 | B2 | 5/2010 | Ozcan et al. |
| 7,805,445 | B2 | 9/2010 | Boyer et al. |
| 7,814,111 | B2 | 10/2010 | Levin |
| 7,827,146 | B1 | 11/2010 | De Landstheer et al. |
| 7,827,190 | B2 | 11/2010 | Pandya |
| 7,870,124 | B2 | 1/2011 | Liu et al. |
| 7,917,299 | B2 | 3/2011 | Buhler et al. |
| 7,930,322 | B2 | 4/2011 | Maclennan |
| 8,190,738 | B2 | 5/2012 | Ruehle |
| 8,498,956 | B2 | 7/2013 | Srinivasan et al. |
| 8,589,436 | B2 | 11/2013 | Srinivasan et al. |
| 8,595,840 | B1 | 11/2013 | Malibiran et al. |
| 8,676,841 | B2 | 3/2014 | Srinivasan et al. |
| 8,738,572 | B2 | 5/2014 | Bird et al. |
| 8,880,493 | B2 | 11/2014 | Chen et al. |
| 9,015,102 | B2 | 4/2015 | Van Lunteren |
| 9,098,587 | B2 | 8/2015 | Deshmukh et al. |
| 9,305,238 | B2 | 4/2016 | Srinivasan et al. |
| 9,934,279 | B2 | 4/2018 | Kali et al. |
| 2003/0065655 | A1 | 4/2003 | Syeda-mahmood |
| 2003/0200198 | A1 | 10/2003 | Chandrasekar et al. |
| 2003/0236766 | A1 | 12/2003 | Fortuna et al. |
| 2004/0024773 | A1 | 2/2004 | Stoffel et al. |
| 2004/0073534 | A1 | 4/2004 | Robson |
| 2004/0117359 | A1 | 6/2004 | Snodgrass et al. |
| 2004/0151382 | A1 | 8/2004 | Stellenberg et al. |
| 2004/0177053 | A1 | 9/2004 | Donoho et al. |
| 2004/0201612 | A1 | 10/2004 | Hild et al. |
| 2005/0273450 | A1 | 12/2005 | McMillen et al. |
| 2006/0106797 | A1 | 5/2006 | Srinivasa et al. |
| 2006/0129554 | A1 | 6/2006 | Suyama et al. |
| 2006/0155719 | A1 | 7/2006 | Mihaeli et al. |
| 2006/0212441 | A1 | 9/2006 | Tang et al. |
| 2006/0242180 | A1 | 10/2006 | Graf et al. |
| 2006/0294095 | A1 | 12/2006 | Berk et al. |
| 2007/0047102 | A1* | 3/2007 | Aguera Y Arcas .... G01C 21/36 359/689 |
| 2007/0076314 | A1 | 4/2007 | Rigney |
| 2007/0226188 | A1 | 9/2007 | Johnson et al. |
| 2008/0016095 | A1 | 1/2008 | Bhatnagar et al. |
| 2008/0034427 | A1 | 2/2008 | Cadambi et al. |
| 2008/0071904 | A1 | 3/2008 | Schuba et al. |
| 2008/0077570 | A1 | 3/2008 | Tang et al. |
| 2008/0077587 | A1 | 3/2008 | Wyschogrod et al. |
| 2008/0082484 | A1 | 4/2008 | Averbuch et al. |
| 2008/0263039 | A1 | 10/2008 | Van Lunteren |
| 2008/0270764 | A1 | 10/2008 | McMillen et al. |
| 2008/0301086 | A1 | 12/2008 | Gupta |
| 2008/0301124 | A1 | 12/2008 | Alves et al. |
| 2008/0301125 | A1 | 12/2008 | Alves et al. |
| 2008/0301135 | A1 | 12/2008 | Alves et al. |
| 2009/0006320 | A1 | 1/2009 | Ding et al. |
| 2009/0019045 | A1 | 1/2009 | Amir et al. |
| 2009/0024622 | A1 | 1/2009 | Chkodrov et al. |
| 2009/0048913 | A1 | 2/2009 | Shenfield et al. |
| 2009/0070786 | A1 | 3/2009 | Alves et al. |
| 2009/0125550 | A1 | 5/2009 | Barga et al. |
| 2009/0216747 | A1 | 8/2009 | Li et al. |
| 2009/0216860 | A1 | 8/2009 | Li et al. |
| 2010/0017379 | A1 | 1/2010 | Naibo et al. |
| 2010/0049710 | A1 | 2/2010 | Young, Jr. et al. |
| 2010/0057663 | A1 | 3/2010 | Srinivasan et al. |
| 2010/0057727 | A1 | 3/2010 | Srinivasan et al. |
| 2010/0057735 | A1 | 3/2010 | Srinivasan et al. |
| 2010/0057736 | A1 | 3/2010 | Srinivasan et al. |
| 2010/0057737 | A1 | 3/2010 | Srinivasan et al. |
| 2011/0055192 | A1 | 3/2011 | Tang et al. |
| 2011/0105857 | A1 | 5/2011 | Zhang et al. |
| 2011/0131588 | A1 | 6/2011 | Allam et al. |
| 2011/0213802 | A1 | 9/2011 | Singh et al. |
| 2012/0206469 | A1* | 8/2012 | Hulubei ............... G09B 29/006 345/581 |
| 2012/0324453 | A1 | 12/2012 | Chandramouli et al. |
| 2014/0095541 | A1 | 4/2014 | Herwadkar et al. |
| 2014/0201225 | A1 | 7/2014 | Deshmukh et al. |
| 2014/0237487 | A1 | 8/2014 | Prasanna et al. |
| 2014/0324530 | A1 | 10/2014 | Thompson et al. |
| 2014/0358959 | A1 | 12/2014 | Bishnoi et al. |
| 2015/0007320 | A1 | 1/2015 | Liu et al. |
| 2015/0161214 | A1 | 6/2015 | Kali et al. |
| 2016/0357782 | A1* | 12/2016 | Jones ..................... G06F 16/29 |
| 2018/0276108 | A1 | 9/2018 | Park et al. |

FOREIGN PATENT DOCUMENTS

| | | |
|---|---|---|
| WO | 2014000819 | 1/2014 |
| WO | 2014113263 | 7/2014 |
| WO | 2015085103 | 6/2015 |
| WO | 2017135837 | 8/2017 |
| WO | 2017135838 | 8/2017 |

OTHER PUBLICATIONS

Huang, Yan, and Chengyang Zhang. "New data types and operations to support geo-streams." International Conference on Geographic Information Science. Springer, Berlin, Heidelberg, 2008 (Year: 2008).*

Abadi et al., Aurora: A New Model and Architecture for Data Stream Management, The VLDB Journal the International Journal on Very Large Data Bases, vol. 12, No. 2, Aug. 1, 2003, pp. 120-139.

Agrawal et al., Efficient Pattern Matching Over Event Streams, Proceedings of the 2008 ACM SIGMOD international conference on Management of data, Jun. 9-12, 2008, pp. 147-160.

Arasu et al., The CQL Continuous Query Language: Semantic Foundations and Query Execution, The VLDB Journal, vol. 15, No. 2, Jun. 1, 2006, pp. 121-142.

(56) References Cited

OTHER PUBLICATIONS

Cadonna et al., Efficient Event Pattern Matching With Match Windows, Proceedings of the 18th ACM SIGKDD international conference on Knowledge discovery and data mining, Aug. 2012, pp. 471-479.
Cranor et al., Gigascope: a Stream Database for Network Applications, Sigmod '03 Proceedings of the 2003 Acm Sigmod International Conference on on Management of Data, Jun. 9, 2003, pp. 647-651.
Martin et al., Finding Application Errors and Security Flaws Using PQL, a Program Query Language, OOPSLA'05, Oct. 16, 2005, pp. 1-19.
Nichols et al., A Faster Closure Algorithm for Pattern Matching in Partial-Order Event Data, IEEE International Conference on Parallel and Distributed Systems, Dec. 2007, pp. 1-9.
International Application No. PCT/RU2016/000039, International Search Report and Written Opinion dated Oct. 18, 2016, 11 pages.
International Application No. PCT/RU2016/000040, International Search Report and Written Opinion dated Oct. 28, 2016, 13 pages.
Stump et al., PLPV '06: Programming Languages meets Program Verification, The 2006 Federated Logic Conference, IJCAR '06 Workshop, 2006, pp. 1-113.
International Application No. PCT/RU2016/000039, International Preliminary Report on Patentability dated Aug. 16, 2018, 8 pages.
International Application No. PCT/RU2016/000040, International Preliminary Report on Patentability dated Aug. 16, 2018, 10 pages.

* cited by examiner

LEVEL OF DETAIL CONTROL FOR GEOSTREAMING

CROSS-REFERENCE TO RELATED APPLICATION

The present application is a continuation of International Application No. PCT/RU2016/000040, filed Feb. 1, 2016, the entire contents of which is herein incorporated by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

DETAILED DESCRIPTION

Figure 1:
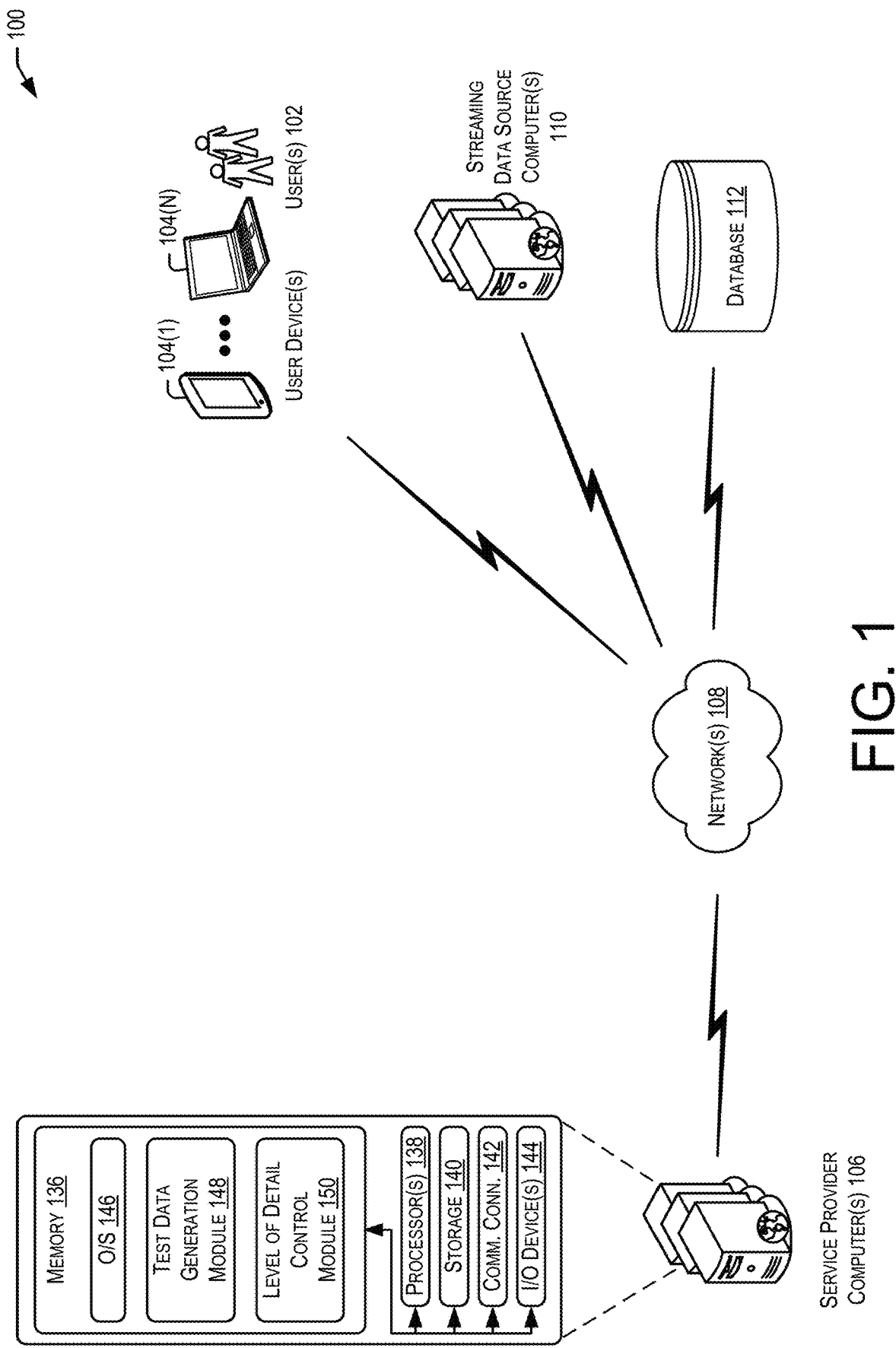
FIG. 1 is a simplified block diagram illustrating an example architecture for implementing the features described herein, according to some embodiments.

In applications such as stock quote monitoring, automobile traffic monitoring, and data sensing, data is generated in the form of a stream of events over time. A data stream, also referred to as an event stream, is a real-time, continuous, sequence of events. Examples of sources that generate data streams include sensors and probes (e.g., radio frequency identification (RFID) sensors, temperature sensors, etc.) configured to send a sequence of sensor readings, financial tickers, network monitoring and traffic management applications sending network status, click stream analysis tools, and others. The term "events" are used interchangeably with "tuples." As used herein, tuples of a stream have the same set of attributes but not necessarily the same attribute values for those attributes. Each tuple is also associated with a particular time. A tuple may be considered to be logically similar to a single row or record in a relational database.

In applications such as fleet management, data is in the form of continuous data streams. The continuous data stream may be a stream of data that arrives at a stream processing server with no explicit end range. By processing the continuous data streams, applications can detect complex patterns, event correlations, and relationships between events. For example, a continuous data stream might have information about automobiles that pass a particular area (e.g., a state, county, or country) where there are significant weather and/or traffic incidents. An automobile can send coordinates continuously. Based upon this data stream, problems such as detecting if an automobile is in the proximity of the certain area of interest such as a traffic accident or severe weather condition can be solved.

Spatial data support in traditional database systems and data processing algorithms are designed to process spatial data stored as finite stored data sets. Traditional database systems store data in database tables where the data may be queried and manipulated using a data management language such as the Structured Query Language (SQL). Database management systems and algorithms are unable to handle continuous data streams of geometries because they are designed based upon the assumption that the system stores a large, but finite, collection of data. Geostreaming with a complex event processor (CEP) can be used to handle continuous data streams that include geospatial information.

In developing Geostreaming applications using CEP, it requires positional information in order to create and test applications. Typically, the positional information is created manually in the textual form such as a Comma Separated Values (CSV) file or a JavaScript Object Notation (JSON) file, using a manual process as follows:

Load the reference polygons into a map.
Find the locations of interesting events.
Get the longitudes and latitudes of the locations.
Save the longitudes and latitudes into a text format.

However, this process is very time consuming especially with creating the time series relations between the locations. Some geostreaming applications require analyzing time series relations between the locations (for example, extended stay in the hazardous area).

Additionally, with geostreaming applications, polygon types are generally used to represent surroundings or moving objects. If the polygon has many vertices, such as polygon representing a whole United States (US) state, the point operations against polygon could be very heavy and could affect the scalability and performance of the CEP server. The typical solution of this problem is to use clustering and add more servers.

In some examples, the solution may be built within a CEP component (e.g., a spatial cartridge component) that handles geostreaming. For pattern-based test data generation, the "pattern" concept may be used in order to abstract the complex applications and allows users to create applications with only providing several parameters. In some examples, for geostreaming applications, the pattern may include a Geofence, an in-route and/or out-of-route, and/or moving object tracking. Since the pattern abstracts the complex algorithm, it may be known what the test data should look like in order to drive the algorithm. For the above geostreaming patterns, the required test data are:

Geofence: a path/route information crossing the polygon representing the virtual surrounding.
In-route/Out-of-route: a deviated path/route information from the original route information.
Moving object tracking: multiple path/route information which cross each other to simulate interactions of objects Here, the test data generator concept may be introduced for each pattern. The test generator is used by the CEP component when applications are created from a pattern. One example implementation of test data generator for Geofence pattern works as follows:

The reference polygon representing the virtual surrounding is fed into the test generator
The test generator has several control parameters that a user can provide:
  a. startDistance: how far the test generator starts from the reference polygons
  b. distanceStep, frequency: how often the test generator sends the test location
  c. pathProvider: simple line, the actual routing, the actual flight/ship path
The test generator first selects two points based on the input polygon and startDistance.
Linestring(s) between two points are creating using pathProvider, either simple line, or routing between two points, or the flight/ship path.

The test generator creates points on the linestring(s) with distanceStep and frequency information. The geodesic interpolation operation is performed while creating points on the linestring(s).
The created points are fed to the processor as the position stream.

Some of pattern has the time series relation concept such as stay in the area in the geofence, extended out-of-route. The test generator can simulate such time series relation in creating points on the linestring(s).

As noted, the solution may be built within a CEP component (e.g., a spatial cartridge component) that handles geostreaming. For level of detail control, the typical operations may include:

Checking if a moving object is within the distance of virtual fence around some area; and
Checking if a moving object is actually in the virtual fence.

For the above operations, typically the polygons are stored in relation (e.g., in a relational database) and also in the spatial index. In some examples, the CEP component may use a two-step query model, that includes:

Querying against spatial index to locate the polygons; and
Pointing operations such as withinDistance or inside between geometries.

Based at least in part on the context and application, the polygons that represent the virtual fence or the moving object does not need to be exact with the actual geometries. For most of the geostreaming applications, the polygons can be approximates of the actual geometries. The level of detail in three-dimensional (3D) computer graphics involves decreasing the complexity of a 3D object representation as it moves away from the viewer or according to other metrics such as object importance, speed or position.

In some cases, a polygon simplification algorithm may be used in reducing the complexities of polygons. The algorithm works as follows in reducing the complexities of polygons:

On loading geometries to relation, the level of simplification is decided using the proximity parameter and the current complexity of polygons.
On visualizing geometries in the map, different level of simplification is applied using the zoom level of map. The output of simplified geometries can be cached and reused.

For dynamic level of detail based on the proximity parameter, most of the geostreaming operations have a proximity parameter (e.g., withinDistance operation requires the distance from the virtual surrounding).

In some examples, the service provider may be configured to calculate the bounding box of the received polygon. Then, the service provider may calculate the horizontal and vertical distances in meters. The following equation may be utilized to determine the fidelity:

$$F=(x*y/p*p)*s$$

where, F: simplification factor 0-100 (0 is the exact representation)
s=scale factor: default is 50
x, y: bounding box of the polygon
p: proximity parameter The level of detail based on the zoom level may be calculated using the following equations:
Z: Zoom level (0-100) 100: maximum zoom level
s: scale factor $$F=(1-z/s)*100$$

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for implementing a pattern-based automated test data generation system and/or a level of detail control system may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of archived relations, configurable data windows associated with archived relations, and/or accurately counting change events associated with managing archived relations described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a test data generation module 148 and a level of detail control module 150. As used herein, modules may refer to programming modules executed by servers or clusters of servers that are part of a service. In this particular context, the modules may be executed by the servers or clusters of servers that are part of the service provider computers 106.

In some examples, the test data generation module 148 may be configured to receive, from an application, a reference polygon that identifies a geographic region on a map; receive, from the application, a control parameter associated with a route on the map; select at least two points on the map based at least in part on the reference polygon and the control parameter; generate a path from a first point of the at least one points to a second point of the at least two points; create points on the path based at least in part on at least one of distance information between the first point and the second point or frequency information between the first point and the second point; generate test data for the application by processing the points on the path; and provide the test data to the application.

In some examples, the level of detail control module 150 may be configured to identify first event data of a first event source, the first event data comprising location information for an affected area of a map; define a polygon comprising points on the map that correspond to at least a subset of each entry of the first event data; determine a first level of detail for processing the first event data based at least in part on context information; change a fidelity of the polygon by adjusting a number of the points of the polygon based at least in part on the first level of detail; receive second event data from a second event source, the second event data comprising position information for an object; identify whether the object is within the affected area based at least in part on a determination of whether the position information matches the points of the polygon; and prepare a user interface for presenting whether the object is within the affected area based at least in part on a second level of detail.

Figure 2:
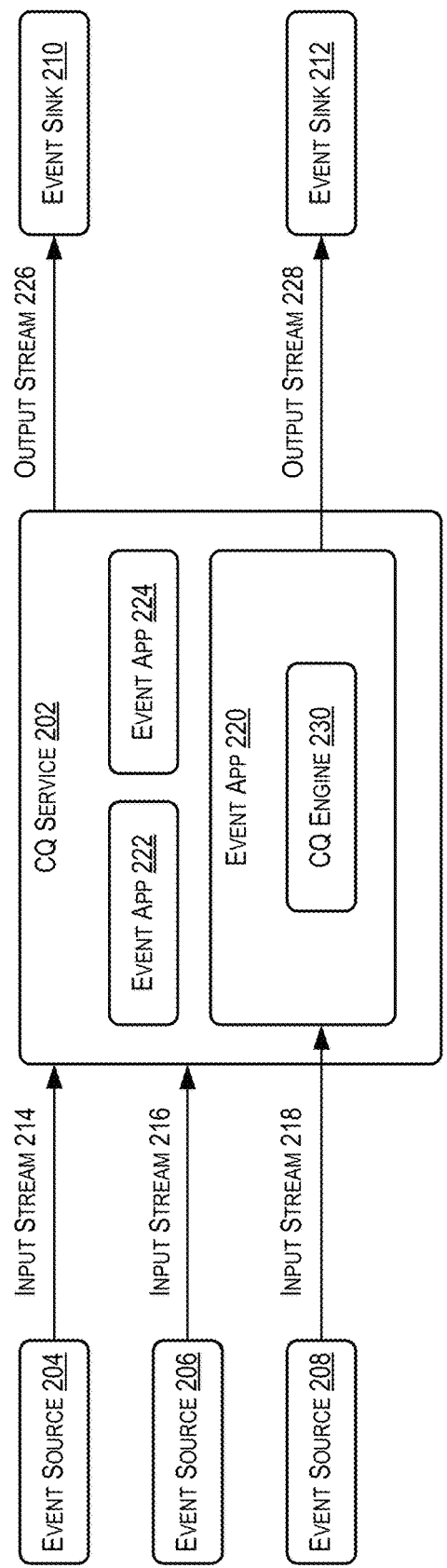
FIG. 2 is a simplified block diagram illustrating at least some features of an event processing engine capable of handling continuous streams of data as described herein, according to at least one example.

FIG. 2 depicts a simplified high level diagram of an event processing system 200 that may incorporate an embodiment of the present disclosure. Event processing system 200 may comprise one or more event sources (204, 206, 208), an event processing server (EPS) 202 (also referred to as CQ Service 202) that is configured to provide an environment for processing event streams, and one or more event sinks (210, 212). The event sources generate event streams that are received by EPS 202. EPS 202 may receive one or more event streams from one or more event sources. For example, as shown in FIG. 2, EPS 202 receives an input event stream 214 from event source 204, a second input event stream 216 from event source 206, and a third event stream 218 from event source 208. One or more event processing applications (220, 222, and 224) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (210, 212) in the form of one or more output event streams. For example, in FIG. 2, EPS 202 outputs an output event stream 226 to event sink 210, and a second output event stream 228 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 220. As shown in FIG. 2, event processing application 220 is configured to listen to input event stream 218, execute a query 230 comprising logic for selecting one or more notable events from input event stream 218, and output the selected notable events via output event stream 228 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 220 in FIG. 2 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, and event types processed by the application. Separate files may be provided for specifying the continuous query or business logic for selection of events.

It should be appreciated that system 200 depicted in FIG. 2 may have other components than those depicted in FIG. 2. Further, the embodiment shown in FIG. 2 is only one example of a system that may incorporate an embodiment of the present disclosure. In some other embodiments, system 200 may have more or fewer components than shown in FIG. 2, may combine two or more components, or may have a different configuration or arrangement of components. System 200 can be of various types including a personal computer, a portable device (e.g., a mobile telephone or device), a workstation, a network computer, a mainframe, a kiosk, a server, or any other data processing system. In some other embodiments, system 200 may be configured as a distributed system where one or more components of system 200 are distributed across one or more networks in the cloud.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Illustrative methods and systems for implementing the test data generation systems and level of detail control systems are described above. Some or all of these systems and methods may, but need not, be implemented at least partially by architectures and processes such as those shown at least in FIGS. 1-2 above.

Figure 3:
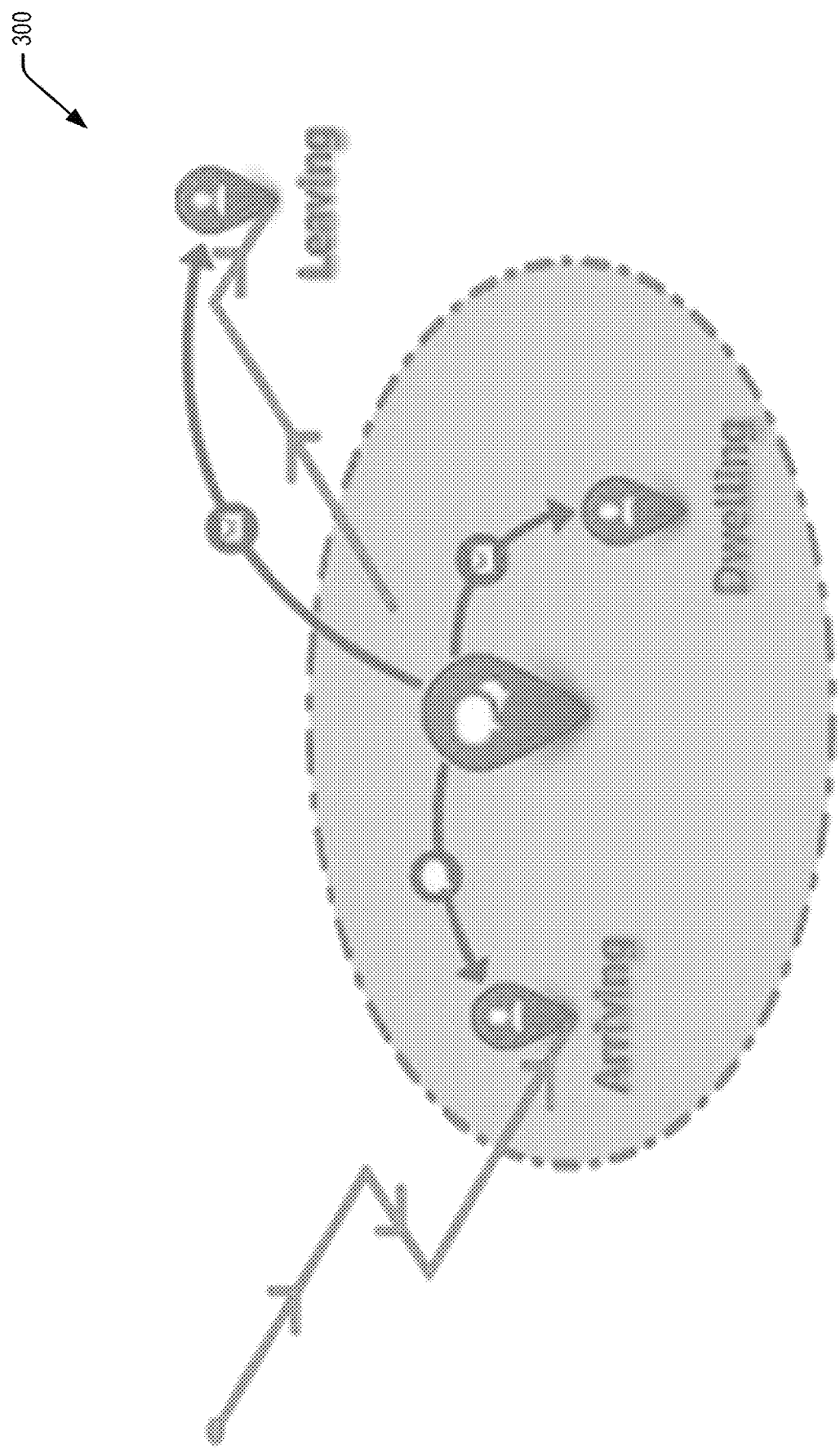
FIG. 3 is another simplified block diagram illustrating an example geofence as described herein, according to some embodiments.

FIG. 3 depicts a simplified diagram of geofence 300. The geofence is one form of location based service that acts as a virtual barrier. The geofence can be either a circle around a point location or a set of boundaries. The geofence may be circular, rectangular, polygonal, and/or multi-polygonal. The primary events that are to be processed and/or tracked with respect to the geofence 300 are when an entity (user, computing device, etc.) enters the geofence 300, exits the geofence 300, or stays (dwells) within the geofence.

Some types of geostreaming include the tracking of moving objects and the generation of events. What can be tracked with moving objects include speed, direction, proximity to stationary object, proximity to other moving objects, if moving objects is in-route or out-of-route from pre-defined path. Among these, proximity to other events is interesting as it's a kind of derived event from a primary event. One example of such case is a distance to a congested area if the congested area is an event calculated from a spatial aggregation.

Figure 4:
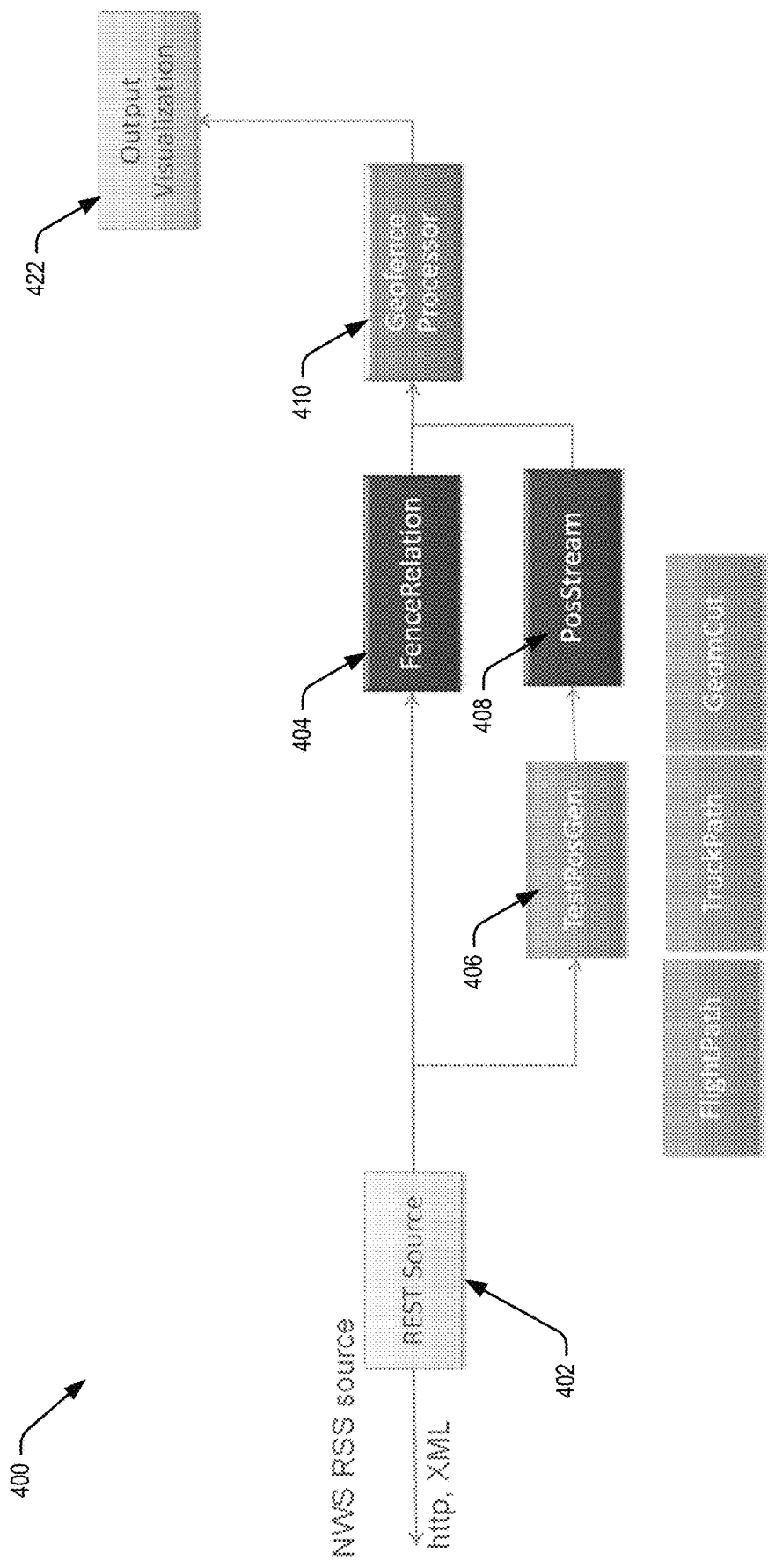
FIG. 4 is a simplified block diagram illustrating an example architecture for implementing the test data generation as described herein, according to some embodiments.

FIG. 4 is a simplified block diagram illustrating an example architecture 400 for implementing the test data generation described herein. In some examples, a Representational State Transfer (REST) source 402 may provide streaming data to the CEP component (e.g., a spatial cartridge). The streaming data may in the form of HyperText Transfer Protocol (http) or Extensible Markup Language (XML) documents. In some examples, the source may actually be a Rich Site Summary (RSS) feed such as, but not limited to, one from the National Weather Service (NWS) or the like. The source data may be processed by a FenceRelation module 404 and/or a test position generator 406. The test position generator 406 may be configured to provide results to a position stream 408 which can, in turn, provide its results to a geofence processor 410. Similarly, results from the fence relation 404 may go to the geofence processor 410. Final results from the geofence processors 410 may be provided to an output visualization module 422.

In some examples, typical position generation may include:

Static Source from CSV, DB
  a. Cannot run with dynamic fences
  b. Hard to create complex scenarios Full Simulator
  a. Need too much resource to develop
  b. Can make complex scenarios Additionally, the TestPathGenerator may include automatic generation of test positions from geofences.

Additionally, the TestPosGenerator may include:

Delay
Step
PathProvider
   a. GeometryCutPathProvider
   b. TruckPathProvider
   c. FlightPathProvider A geometry cut path provider may:
Generate a line which cuts geometries with properties of:
   startDistance
   distanceStep
A route provider may:
setup 'routeProvider' to create actual route using the road data
   a. simplifyThreshold
   b. routeProivder A flight path provider may utilize an airport database (e.g., from openflights.org or other sites), may select two airports, and/or may create a geodesic path. Additionally, a routing engine may include a RouteProvider interface.

Figure 5:
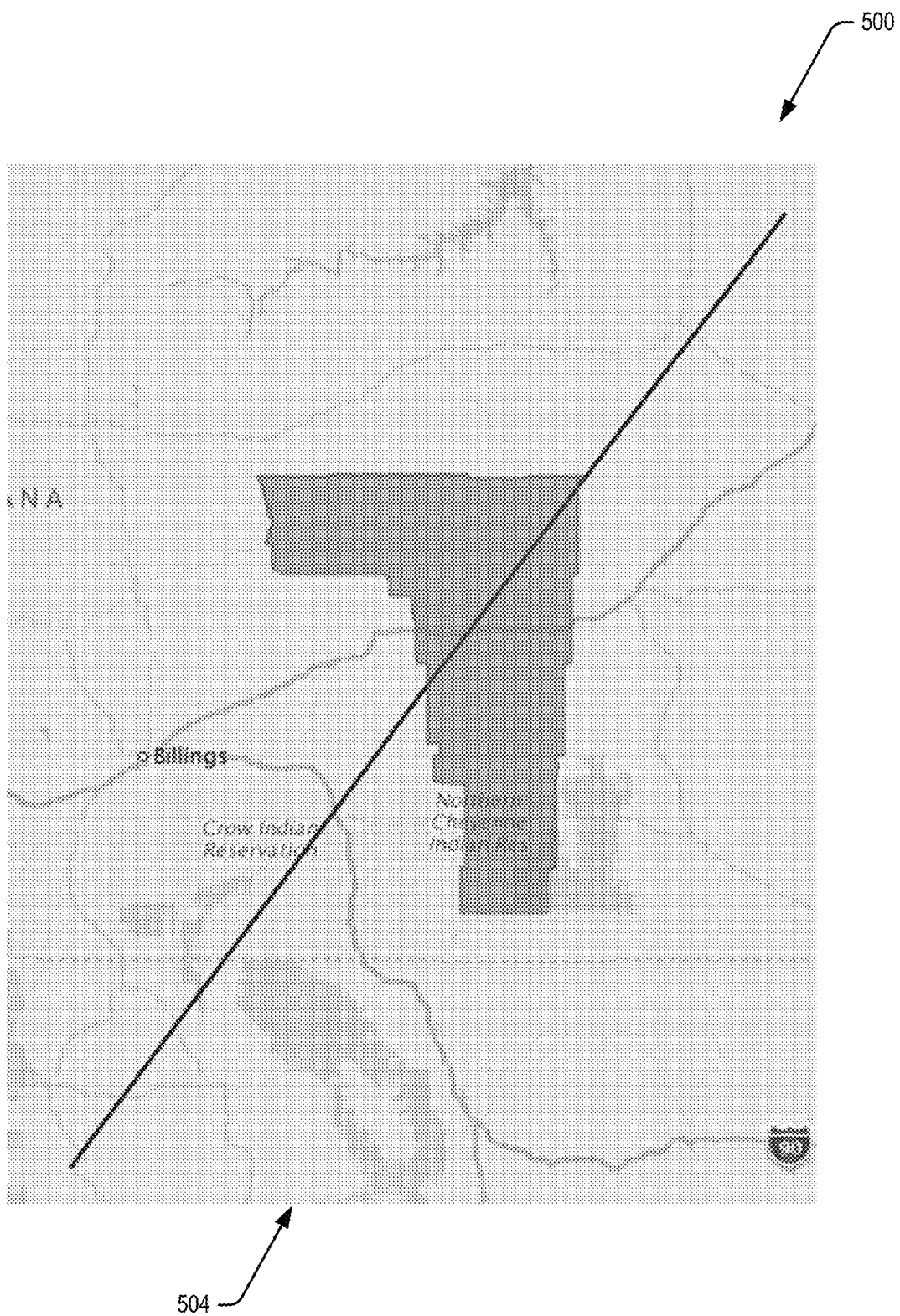
FIG. 5 is a simplified block diagram illustrating an example representation for implementing the test data generation as described herein, according to some embodiments.

FIG. 5 is a simplified block diagram illustrating an example representation 500 for implementing the test data generation described herein. In FIG. 5, the representation 500 is of a polygon (e.g., an area affected by inclement weather, a county, a sub-region, etc.) that happens to be located in Montana. The polygon data may be received by a stream of weather data or the like and may change as new location information is received (e.g., in a stream). For example, if weather data is received from the NWS, the weather data may indicate an area affected by a storm. The points of the polygon may be received by the NWS data (e.g., in an RSS feed). Data points of the polygon may be stored in a relational database and plotted on the representation (map) 500 of FIG. 5. Additionally, two points may be received from an application (e.g., a mobile map/weather application) that intends to test out its own use of the polygon information. A geofence processor (e.g., 410 of FIG. 4) or the like may be utilized to plot the two points on the map. These two points can simulate a user (e.g., truck or other vehicle) traveling through the affected area that is represented by the polygon. Once other information (e.g., route, speed, etc.) is received, a straight line (or other type of line) can be generated between the two points. Speed information can then be utilized to determine additional points along the line between the in-route and out-of-route points (the two initial points). This data is the test data, generated by this system, and is provided back to the application. The application can then determine whether it is working properly or will be able to process the incoming data properly.

Figure 6:
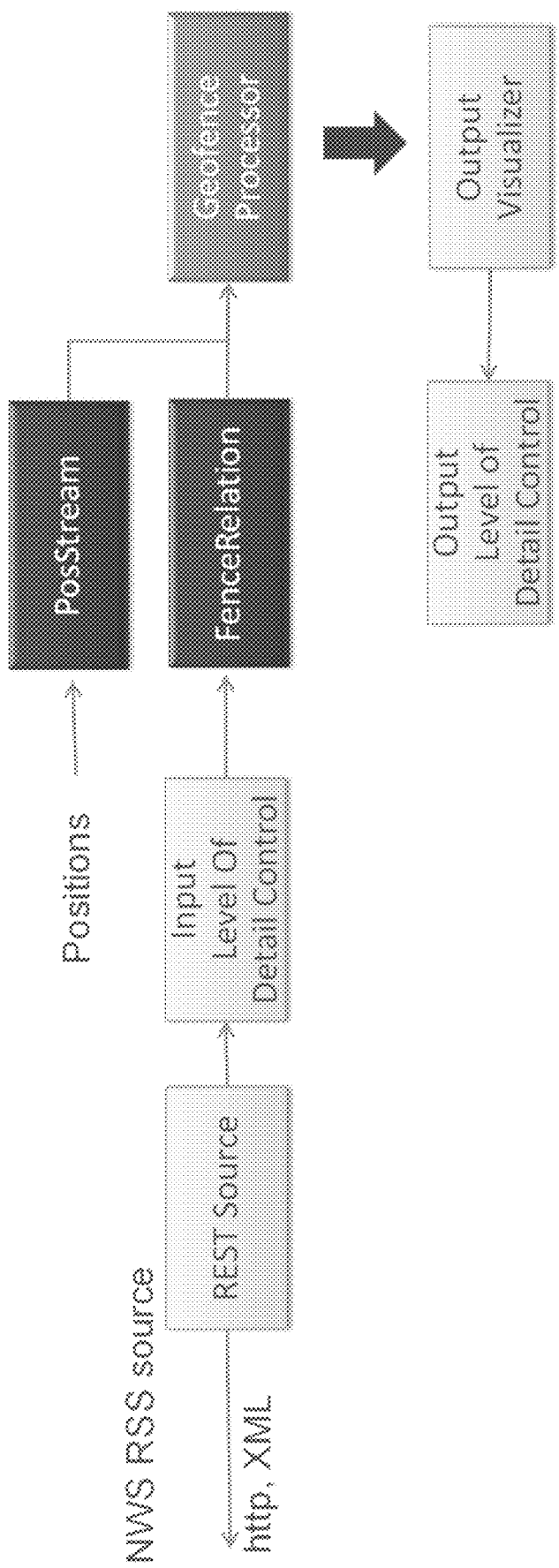
FIG. 6 is a simplified block diagram illustrating an example architecture for implementing the level of detail control as described herein, according to some embodiments.

FIG. 6 is a simplified block diagram illustrating an example architecture 600 for implementing the level of detail control as described herein. Similar to FIG. 5, a REST source may provide polygon information for an affected area or for any geofence application. In some examples, the information may be parsed and/or converted from event format to tuple format. A first level of detail control may be determined (e.g., using a first algorithm) to reduce the fidelity of the polygon. This is the input level of control. This data may be passed to the fence relation module. Additionally, position information from one or more entities (e.g., trucks, users, etc.) may be received and processed by a position stream processor. A spatial join may then be performed, where the polygon information from the fence relation may be joined with the spatial information (e.g., the position info from trucks). A geofence processor may perform the joining of the data, and an output visualizer may prepare the joined data for visualization. Once prepared, a second level of detail control (e.g., using a different algorithm) may be utilized to increase or decrease the fidelity of the data to visualized based at least in part on a zoom level. The zoom level may be configured by a user as they review the visualization.

Figure 7:
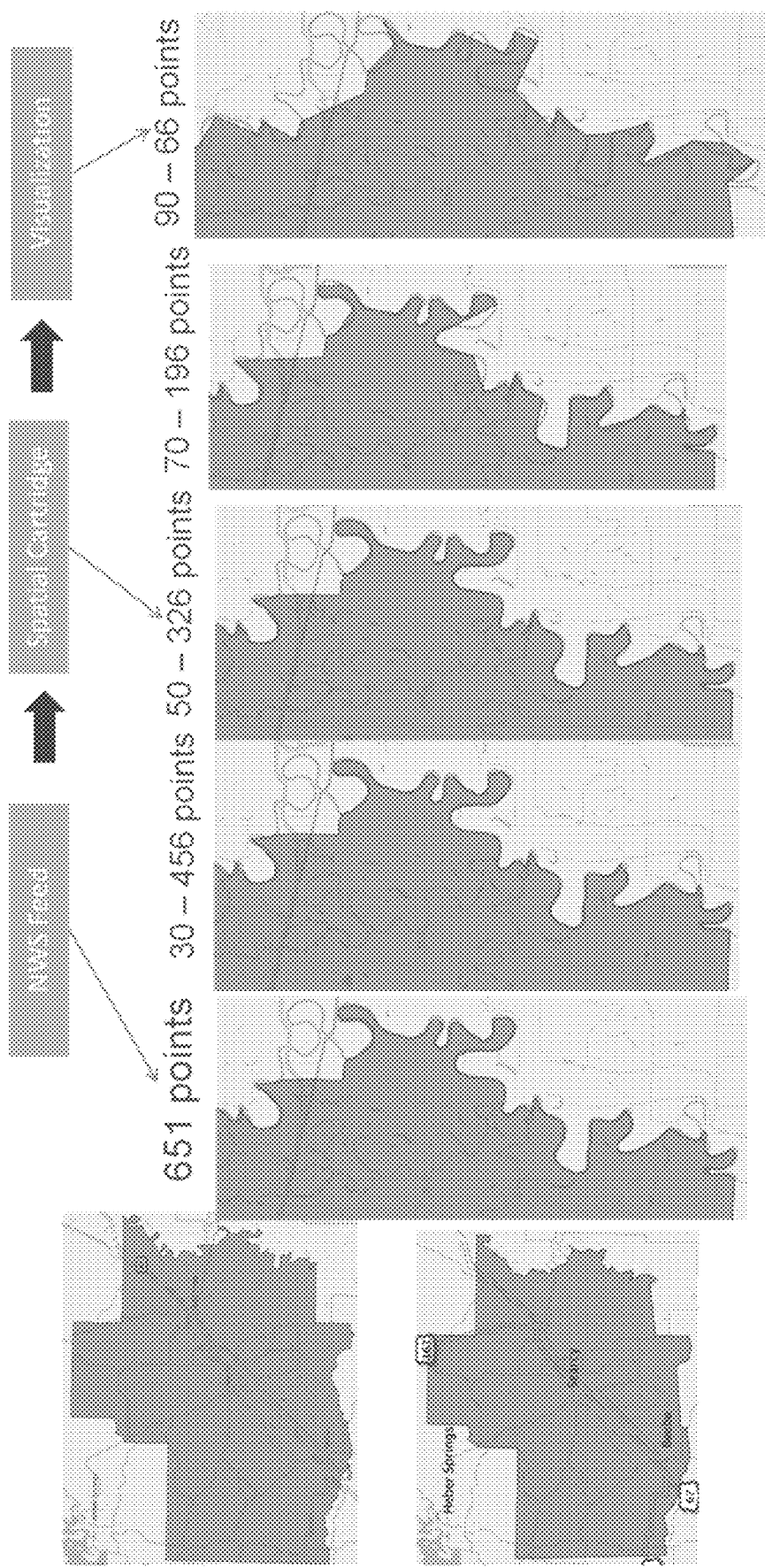
FIG. 7 is a simplified block diagram illustrating an example representation for implementing the level of detail control as described herein, according to some embodiments.

FIG. 7 is a simplified block diagram illustrating an example representation 700 for implementing the level of detail control as described herein. In this figure, it is shown that the data may be received at a first fidelity (e.g., 651 points for the polygon), but then the level of detail may be changed (e.g., reduced) in order to enable faster (less processor-intensive) calculation of whether trucks entering the area are going to intersect with the polygon. Only once it is determined that a truck is near to the polygon, does the system need to have a higher fidelity. Additionally, once a truck is within the polygon, a much lower fidelity may be used, thus further reducing the amount processing power required to perform the calculations. In some examples, the spatial cartridge may perform the majority of the processing at a fairly low fidelity. For visualization, the fidelity may be increased based at least in part on the zoom level of the user. For example, if the user attempts to zoom in closer, the fidelity will need to be increased. However, if the user is zoomed out relatively far, the fidelity can remain relatively low.

Figure 8:
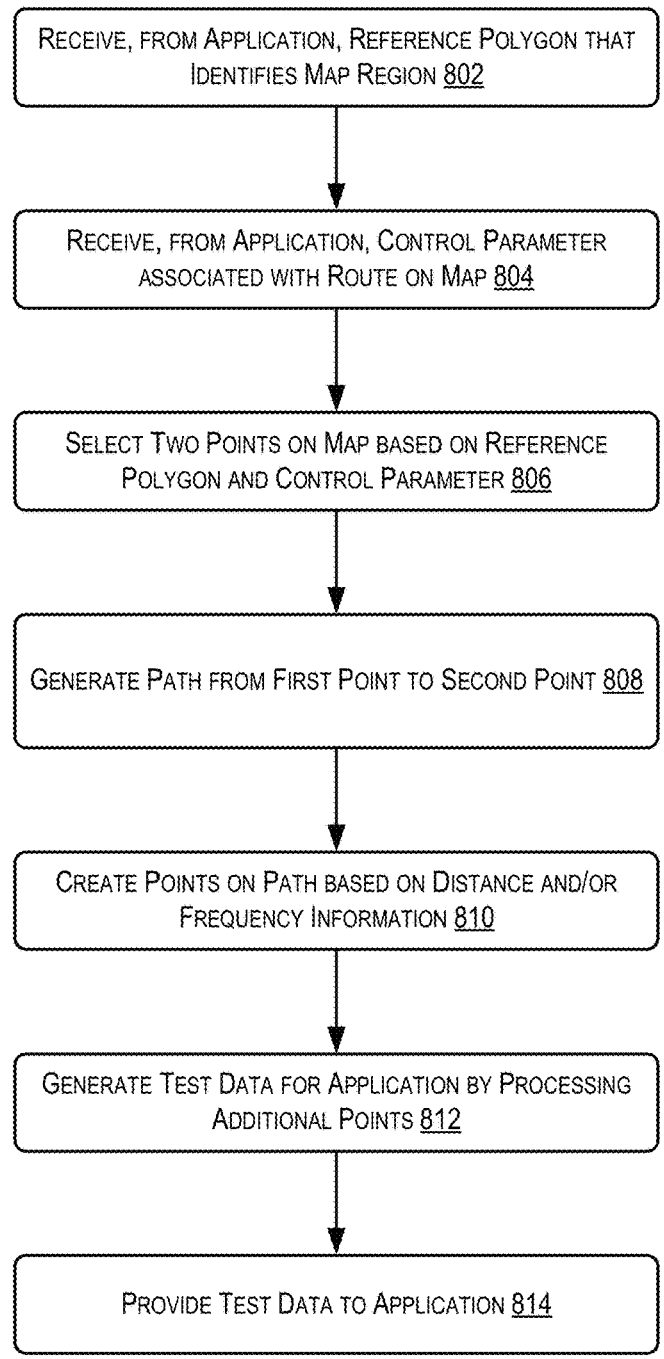
FIG. 8 is a simplified block diagram illustrating an example flow for implementing the test data generation as described herein, according to some embodiments.
Figure 9:
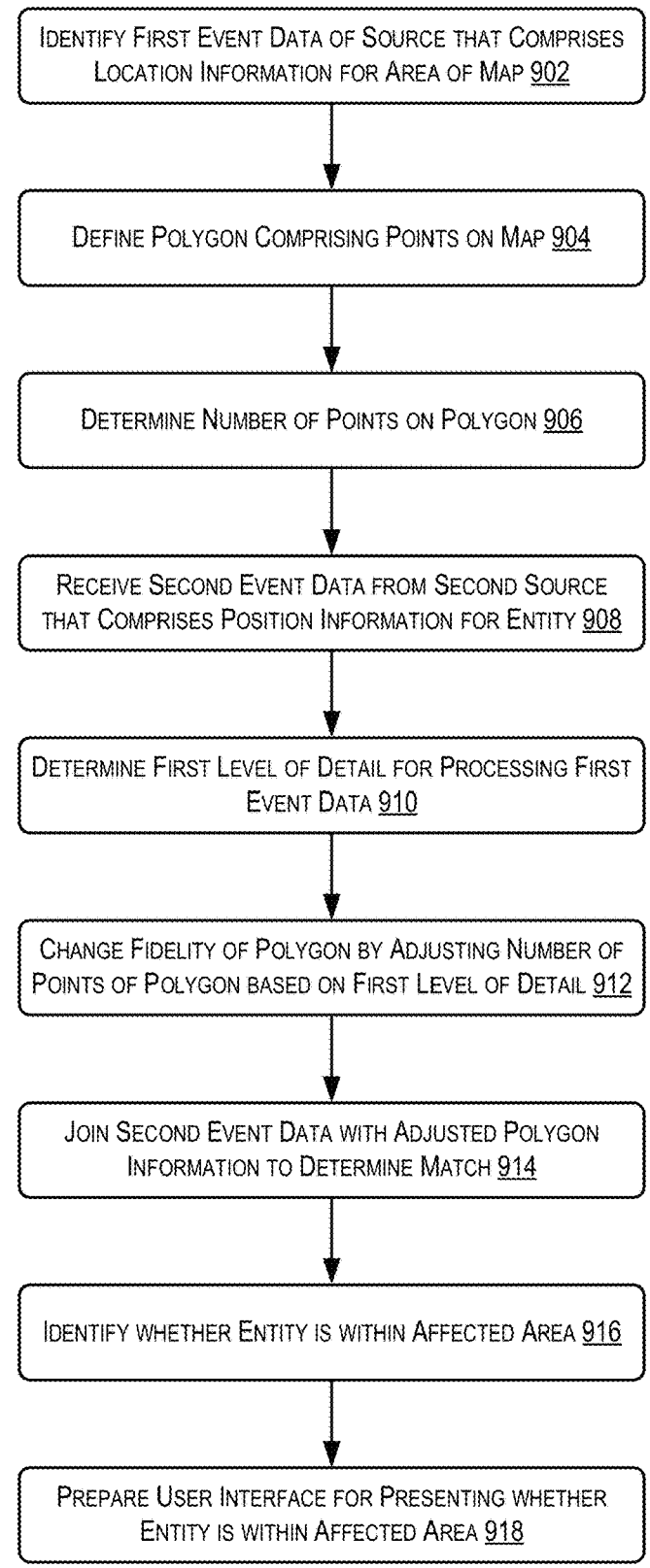
FIG. 9 is a simplified block diagram illustrating an example flow for implementing the level of detail control as described herein, according to some embodiments.

FIGS. 8 and 9 are flow diagrams of processes for implementing systems and methods described herein, in accordance with at least some embodiments. The processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the test data generation module 148 and/or the level of detail control module 150 shown in FIG. 1 may perform the processes 800 and 900 of FIGS. 8 and 9, respectively. In FIG. 8, the process 800 may include receiving, from an application, a reference polygon that identifies a geographic region on a map at 802; receiving, from the application, a control parameter associated with a route on the map at 804; selecting at least two points on the map based at least in part on the reference polygon and the control parameter at 806; generating a path from a first point of the at least one points to a second point of the at least two points at 808; creating points on the path based at least in part on at least one of distance information between the first point and the second point or frequency information between the first point and the second point at 810; generating test data for the application by processing the points on the path at 812; and providing the test data to the application at 814.

In FIG. 9, the process 900 may include identifying first event data of a first event source, the first event data comprising location information for an affected area of a map at 902; defining a polygon comprising a point on the map for at least a subset of each entry of the first event data at 904; determining a number of points of the polygon at 906; receiving second event data from a second event source, the second event data comprising position information for an entity located at a physical location represented by the map at 908; determining a first level of detail for processing the first event data based at least in part on context information associated with the map or the entity at 910; changing a fidelity of the polygon by adjusting the number of points of the polygon based at least in part on the first level of detail at 912; joining the second event data with adjusted polygon information that corresponds to the adjusted number of points of the polygon to determine whether the position information matches the adjusted polygon information at 914; identifying whether the entity is within the affected area based at least in part on the determination of whether the position information matches the adjusted polygon information at 916; and preparing a user interface for presenting whether the entity is within the affected area based at least in part on a second level of detail at 918.

Figure 10:
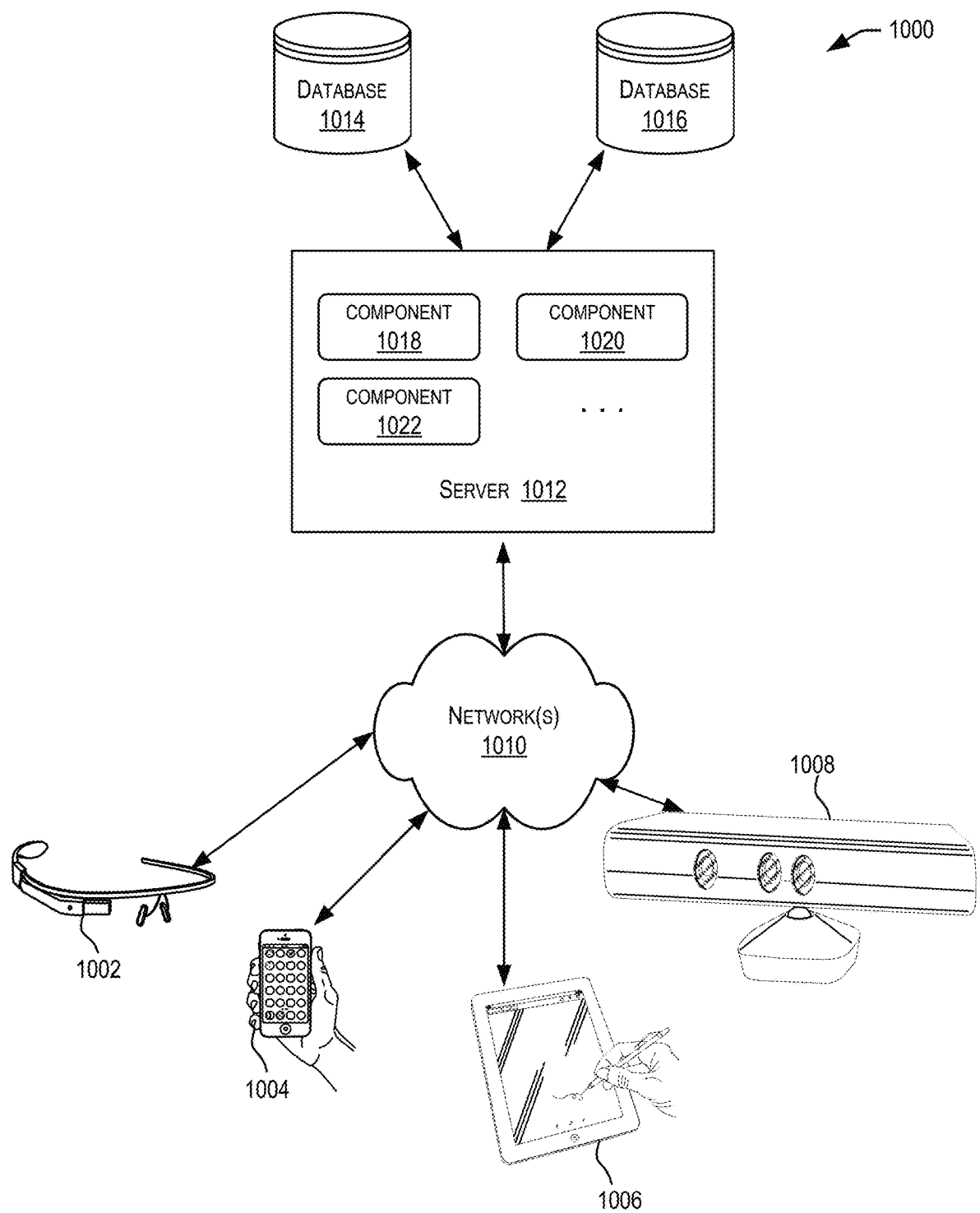
FIG. 10 is a simplified block diagram illustrating a distributed system for implementing some of the examples described herein, according to at least one example.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
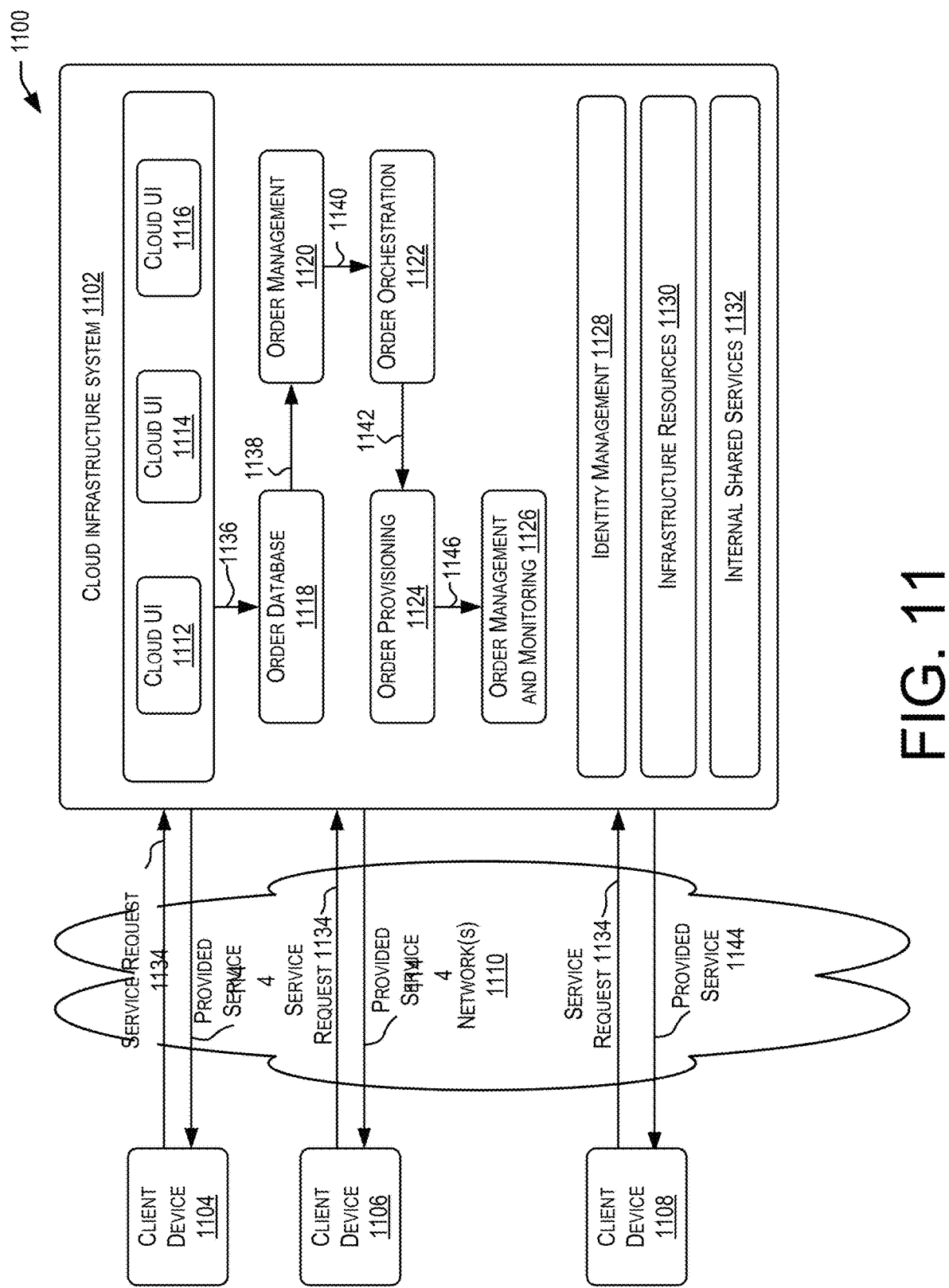
FIG. 11 is a simplified block diagram illustrating components of a system environment by which services provided by the components of an embodiment system may be offered as cloud services, in accordance with some of the examples described herein, according to at least one example.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 610.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
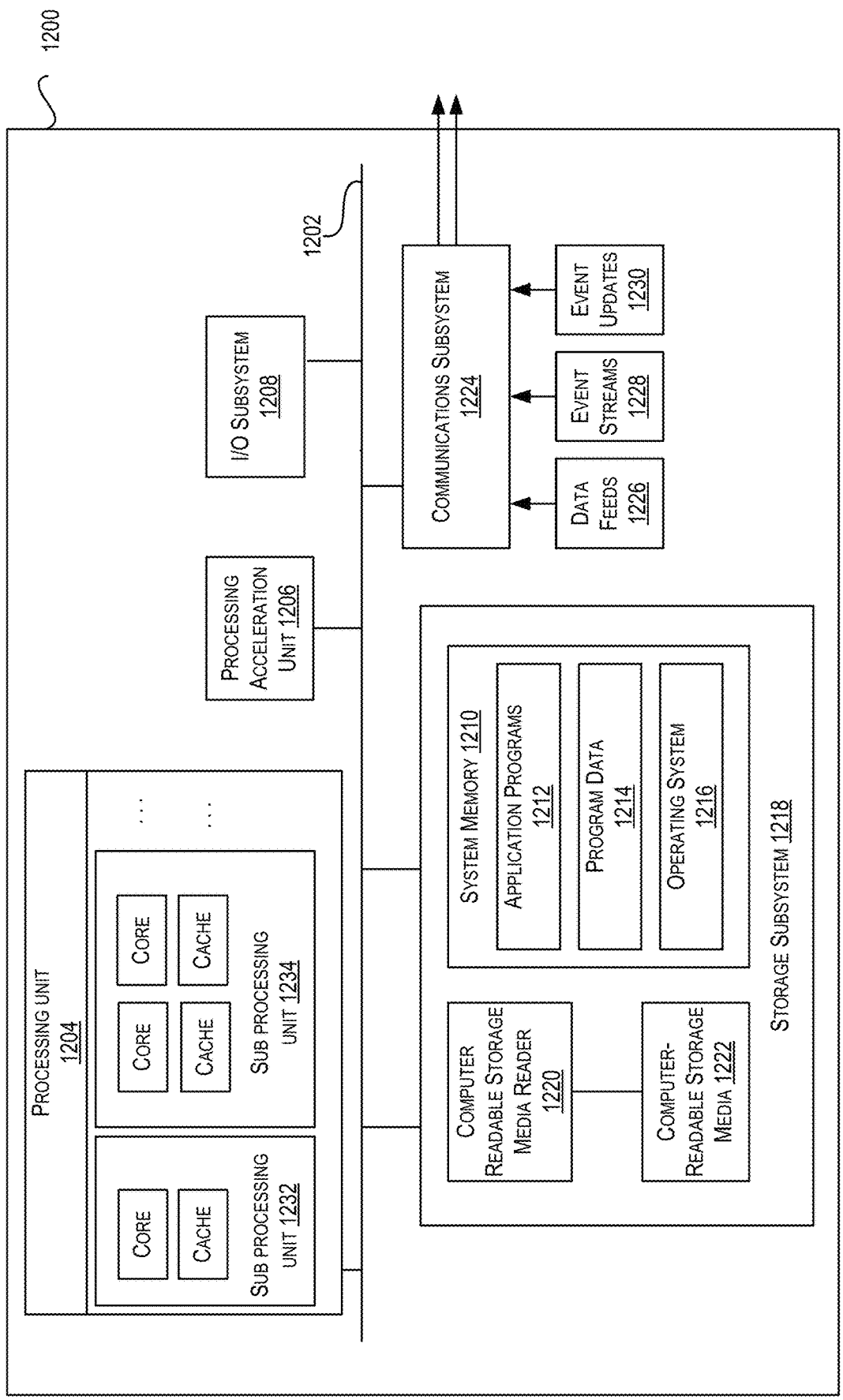
FIG. 12 is a simplified block diagram illustrating an example computer system, in which various embodiments of the present disclosure may be implemented in accordance with some of the examples described herein, according to at least one example.

FIG. 12 illustrates an exemplary computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    identifying first event data of a first event source, the first event data comprising location information for an affected area of a map;
    defining a polygon comprising a point on the map for at least a subset of each entry of the first event data;
    determining a number of points of the polygon;
    receiving second event data from a second event source, the second event data comprising position information for an entity located at a physical location represented by the map;
    determining a first level of detail for processing the first event data based at least in part on context information associated with the map or the entity;
    changing a fidelity of the polygon by adjusting the number of points of the polygon based at least in part on the first level of detail;
    joining the second event data with adjusted polygon information that corresponds to the adjusted number of points of the polygon to determine whether the position information matches the adjusted polygon information;
    identifying whether the entity is within the affected area based at least in part on the determination of whether the position information matches the adjusted polygon information;
    determining a second level of detail for presenting a visualization of whether the entity is within the affected area;

determining whether the entity is within the affected area based at least in part on the second level of detail;
preparing a user interface for presenting the visualization of whether the entity is within the affected area; and
providing the user interface for presentation of the map.

2. The method of claim 1, wherein the context information comprises a proximity parameter with a direct mathematical relationship to a relative proximity of the entity with the affected area.

3. The method of claim 2, wherein the first level of detail is decreased as the proximity parameter increases, and wherein the first level of detail is increased as the proximity parameter decreases.

4. The method of claim 1, wherein the context information comprises a complexity parameter with a direct mathematical relationship to a relative complexity of a shape of the polygon.

5. The method of claim 4, wherein the first level of detail is decreased as the complexity parameter increases, and wherein the first level of detail is increased as the complexity parameter decreases.

6. The method of claim 5, wherein adjusting the number of points of the polygon comprises decreasing the number of points when the first level of detail is decreased or increasing the number of points when the first level of detail is increased.

7. The method of claim 1, wherein the location information comprises at least one of a geographic attribute or a spatial attribute.

8. The method of claim 1, further comprising determining the second level of detail for visualizing whether the entity is within the affected area based at least in part on a zoom level of the map.

9. A computer-readable medium storing computer-executable instructions that, when executed by one or more processors, configures one or more computer systems to perform at least:
instructions that cause the one or more processors to identify first event data of a first event source, the first event data comprising location information for an affected area of a map;
instructions that cause the one or more processors to define a polygon comprising points on the map that correspond to at least a subset of each entry of the first event data;
instructions that cause the one or more processors to determine a first level of detail for processing the first event data based at least in part on context information;
instructions that cause the one or more processors to change a fidelity of the polygon by adjusting a number of the points of the polygon based at least in part on the level of detail;
instructions that cause the one or more processors to receive second event data from a second event source, the second event data comprising position information for an object;
instructions that cause the one or more processors to identify whether the object is within the affected area based at least in part on a determination of whether the position information matches the points of the polygon;
instructions that cause the one or more processors to determine a second level of detail for presenting a visualization of whether the entity is within the affected area;
instructions that cause the one or more processors to determine whether the entity is within the affected area based at least in part on the second level of detail;
instructions that cause the one or more processors to prepare a user interface for presenting the visualization of whether the object is within the affected area; and
instructions that cause the one or more processors to provide the user interface for presentation of the map.

10. The computer-readable medium of claim 9, wherein adjusting the number of points of the polygon comprises decreasing the number of points when the first level of detail is decreased or increasing the number of points when the first level of detail is increased.

11. The computer-readable medium of claim 9, further comprising instructions that cause the one or more processors to determine the second level of detail for visualizing whether the entity is within the affected area based at least in part on a zoom level of the map.

12. The computer-readable medium of claim 9, wherein the polygon defines a geofence.

13. The computer-readable medium of claim 12, further comprising instructions that cause the one or more processors to determine whether the object is within a distance of the geofence prior to identifying whether the object is within the affected area.

14. The computer-readable medium of claim 9, wherein the first event data comprises weather information.

15. A system, comprising:
a memory storing a plurality of instructions; and
a processor configured to access the memory, the processor further configured to execute the plurality of instructions to at least:
identify first event data of a first event source, the first event data comprising location information for an affected area of a map;
define a polygon comprising points on the map that correspond to at least a subset of each entry of the first event data;
determine a first level of detail for processing the first event data based at least in part on context information;
change a fidelity of the polygon by adjusting a number of the points of the polygon based at least in part on the level of detail;
receive second event data from a second event source, the second event data comprising position information for an object;
identify whether the object is within the affected area based at least in part on a determination of whether the position information matches the points of the polygon;
determine a second level of detail for presenting a visualization of whether the entity is within the affected area;
determine whether the entity is within the affected area based at least in part on the second level of detail;
prepare a user interface for presenting the visualization of whether the object is within the affected area; and
provide the user interface for presentation of the map.

16. The system of claim 15, wherein the polygon is stored in a spatial index.

17. The system of claim 16, wherein the first event data is identified by querying against the spatial index.

18. The system of claim 15, wherein the polygon is an approximation of the first event data.

19. The system of claim 15, wherein the object comprises a computing device on a vehicle moving at a physical location approaching or within the polygon.

20. The system of claim 15, wherein the context information comprises a relative complexity of the polygon, and wherein the number of points of the polygon are reduced when the relative complexity of the polygon is above a threshold.

\* \* \* \* \*